US008799626B2

(12) United States Patent
Chang et al.

(10) Patent No.: US 8,799,626 B2
(45) Date of Patent: Aug. 5, 2014

(54) PRIORITIZED ASSIGNMENT OF SUB-RANGE REGISTERS OF CIRCULARLY ADDRESSABLE EXTENDED REGISTER FILE TO LOOP VARIABLES IN RISC PROCESSOR

(75) Inventors: Rong-Guey Chang, Chia-Yi County (TW); Yuan-Shin Hwang, Chia-Yi County (TW); Chia-Hsien Su, Chia-Yi County (TW)

(73) Assignee: National Chung Cheng University, Chia-Yi County (TW)

( * ) Notice: Subject to any disclaimer, the term of this patent is extended or adjusted under 35 U.S.C. 154(b) by 441 days.

(21) Appl. No.: 13/229,078

(22) Filed: Sep. 9, 2011

(65) Prior Publication Data

US 2012/0210100 A1   Aug. 16, 2012

(30) Foreign Application Priority Data

Feb. 15, 2011   (TW) .............................. 100104989 A

(51) Int. Cl.
*G06F 9/30*   (2006.01)
(52) U.S. Cl.
CPC ....................................... *G06F 9/30* (2013.01)
USPC ...................... 712/208; 712/217; 712/E9.023
(58) Field of Classification Search
None
See application file for complete search history.

(56) References Cited

U.S. PATENT DOCUMENTS

| 5,367,684 | A  | * | 11/1994 | Smith ........................... 717/140 |
| 5,790,862 | A  | * | 8/1998  | Tanaka et al. ................. 717/159 |
| 6,157,996 | A  | * | 12/2000 | Christie et al. ............... 712/218 |
| 6,745,320 | B1 | * | 6/2004  | Mitsuishi ...................... 712/225 |
| 7,373,483 | B2 | * | 5/2008  | Henry et al. .................. 712/210 |
| 7,617,496 | B2 | * | 11/2009 | Gonion ......................... 717/161 |
| 7,814,299 | B2 | * | 10/2010 | Hickey et al. ................. 712/208 |
| 8,104,026 | B2 | * | 1/2012  | Koseki et al. ................. 717/140 |
| 2011/0047355 | A1 | * | 2/2011  | Mejdrich et al. ............. 712/208 |
| 2012/0265967 | A1 | * | 10/2012 | Gschwind et al. ............ 712/210 |

* cited by examiner

*Primary Examiner* — Kenneth Kim
(74) *Attorney, Agent, or Firm* — Muncy, Geissler, Olds & Lowe, P.C.

(57) ABSTRACT

A segmental allocation method of expanding RISC processor register includes the steps of a) setting an instruction format of the RISC processor, the destination register field being set having 6 bits to correspond to 64 registers and at least one source register field having at least 4 bits to correspond to at least 16 registers; b) providing two solutions to the problem resulting from that the instruction format in the step a) goes beyond range under some circumstances; and c) setting a register segment allocation algorithm having the steps of c1) providing and grouping a plurality of pseudo registers; c2) prioritizing the pseudo registers in each of the groups; c3) combining the groups pursuant to the priorities thereof; and c4) locating the physical register of lowest computational cost.

8 Claims, 4 Drawing Sheets

| Type | -31-<br>(bits) | | | format<br>-0- | | |
|---|---|---|---|---|---|---|
| R | opcode (6) | rs (5) | rt (5) | rd (5) | shamt (5) | funct (6) |
| I | opcode (6) | rs (5) | rt (5) | immediate (16) | | |
| J | opcode (6) | address (26) | | | | |

91 (pointing to rs, rt, rd fields)

FIG.4
PRIOR ART

PRIORITIZED ASSIGNMENT OF SUB-RANGE REGISTERS OF CIRCULARLY ADDRESSABLE EXTENDED REGISTER FILE TO LOOP VARIABLES IN RISC PROCESSOR

BACKGROUND OF THE INVENTION

1. Field of the Invention

The present invention relates generally to a processor register, and more particularly, to a segment allocation method of expanding an RISC (reduced instruction set computer) processor register.

2. Description of the Related Art

As technology develops very quickly, it has not been difficult for adding a physical register into a CPU (central processing unit) in hardware. However, before the register is added, the existing ISA (instruction set architecture) must be changed and registers cannot be effectively applied and the code size fails to be reduced, so the compilers of 32 registers are still in the majority.

To improve the executive performance, the instruction level parallelism is applied more and more to currently available processors and compliers. However, development of high instruction level parallelism and relevant optimization needs a lot of registers as support. Besides, in the embedded system, limited memory capacity and low power consumption further highlight the significance of lots of registers. Pitifully, the number of the registers fails to be greatly increased subject to some traditional In the architecture of the RISC commonly applied to the embedded system, there are 32 registers, so one instruction includes three register fields 91 (Rd, Rt, and Rs) at most and the code space of each register field 91 is 5 bits. Taking MIPS (millions of instructions per second) as an example, the distribution state of the each register field in the instruction is shown in FIG. 4. In such encoding, each of the register fields is 5-bit, so the number of the register corresponding to each register field is $2^5=32$. In other words, such encoding has limited the number of the registers to 32.

If the code space of adding the register field is one bit, the required capacity for one instruction may be increased up to 2-3 bits. For example, in an Alpha instruction set, the code space of the register field takes 28%; in an ARM instruction set, it takes 25%. Thus, if the code space of the register field is changed, the code will be greatly affected, as well as the hardware, e.g. decoding stage in the pipeline, stretching clock cycles, or increasing power consumption. Under the circumstances, it is infeasible to increase the number of the registers by enlarging the code space of the register field.

In light of the above, the number of the registers cannot be increased primarily because of influential factors such as the code size. Nevertheless, such limitation is adverse to the growth of the performance to decrease some possibilities of optimization. For example, when the register is insufficient, it is necessary to spill the registers out to the memory. However, when the register is sufficient, such process is not very necessary and it may be adverse to the performance because what it takes for access to the memory is slower than that of the internal process of the processor, such as accessing the register. Therefore, it is unattainable for the existing technology to increase the number of the registers.

SUMMARY OF THE INVENTION

The primary objective of the present invention is to provide a segmental allocation method of expanding RISC processor register, which can increase the number of the registers without increasing the length of the register field in the existing instruction and can effectively make use of all of the registers but no great effect is applied to the code size.

The foregoing objective of the present invention is attained by the segmental allocation method of expanding RISC processor register, which includes steps of a) setting an instruction format of the RISC processor, the instruction format having at least two register fields whose number corresponds to that of the registers and which are a destination register field and at least one source register respectively, the destination register field being set having 6 bits for saving a register code corresponding to 64 registers and the source register field has 4 bits for saving a difference that is defined between the code of the register of the destination register field and that of the source register field, the difference corresponding to at least 16 registers and the registers corresponding to the at least two source register fields being defined as a stack pointer register and a zero register respectively, the capacity of the source register field for saving the difference depending on its size minus what it takes for defining the two registers; b) providing two solutions to the problem resulting from that the instruction format in the step a) goes beyond range under some circumstances as follows: (i) regarding the 64 (0-63) registers corresponding to the destination register field as an endless circle, namely deeming the 63rd and 0 register adjacent and connected with each other; (ii) reserving a plurality of the registers among the 64 registers and defining them as plural reserved registers, the plural reserved registers being spaced from one another for a predetermined number of the registers, the plural reserved registers being adapted for convenient insertion of a special movement instruction that can enable data movement among the registers each having a register field of less than 9 bits, i.e. among fewer than 128 registers; and c) setting a register allocation algorithm for finding a desired physical register among physical registers for the registers required by one instruction, the algorithm including steps of c1) providing and grouping a plurality of pseudo registers according to the loop range of the instruction; if one of the pseudo registers is used by a lot of loops, the pseudo register will be precedentially assigned to the loop having more levels in the process of the grouping; as the loops are more, the priority is higher; c2) prioritizing the pseudo registers in each of the groups according to three conditions including frequency of occurrence of the pseudo register in the instructions, frequency of use of the pseudo register, and length of service cycle of the pseudo register; c3) combining the groups pursuant to the priorities of the groups; and c4) locating the physical register of lowest computational cost according to the frequency of use of the instruction and the number of the instruction beyond range among the pseudo registers, wherein this physical register is the desired one to be used, and then making the pseudo register correspond to this physical register. In light of this, the number of the registers can expandably reach 64, all of the registers can be efficiently used, and the code size can be less affected, without increasing the length of the register field in the existing instruction.

BRIEF DESCRIPTION OF THE DRAWINGS

FIG. 4 is a schematic view showing the instruction format of the conventional MIPS processor.

DETAILED DESCRIPTION OF PREFERRED EMBODIMENTS

Figure 1:
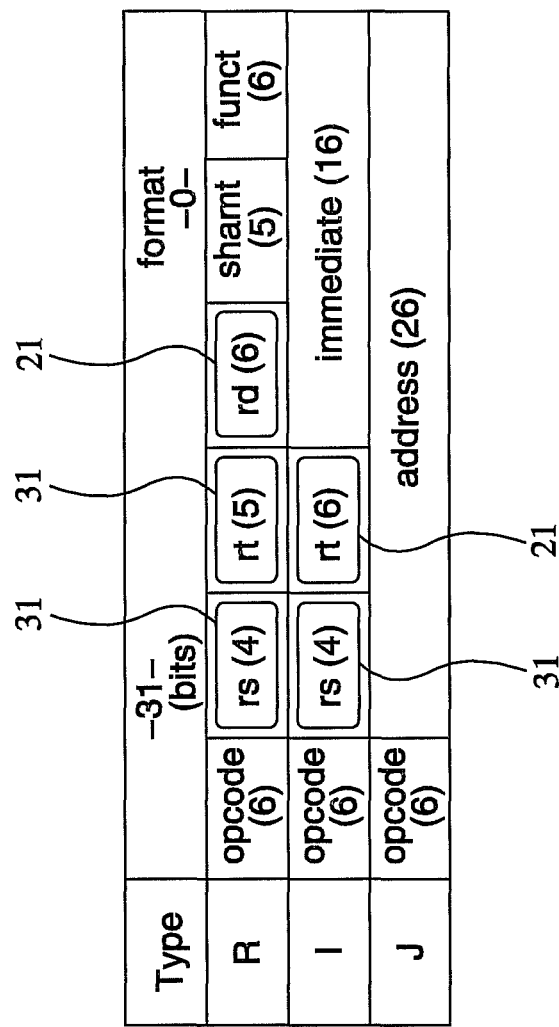
FIG. 1 is a schematic view of first and second preferred embodiments of the present invention, showing the instruction format.
Figure 2:
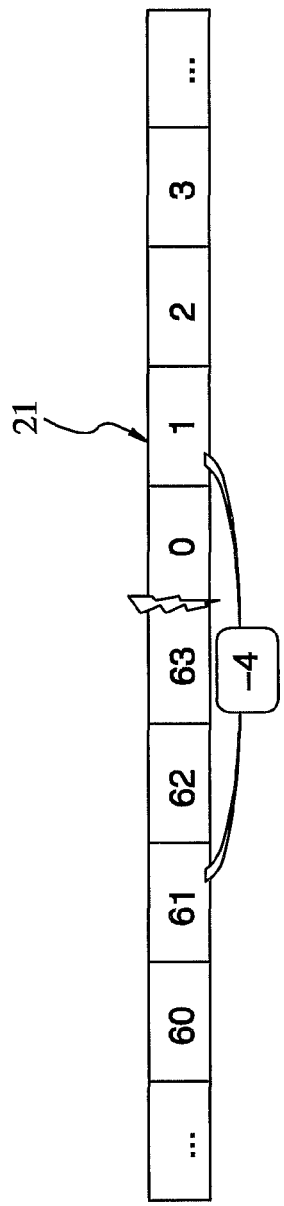
FIG. 2 is a schematic view of the first preferred embodiment of the present invention, showing that the 64 registers are regarded as an endless circle.
Figure 5:
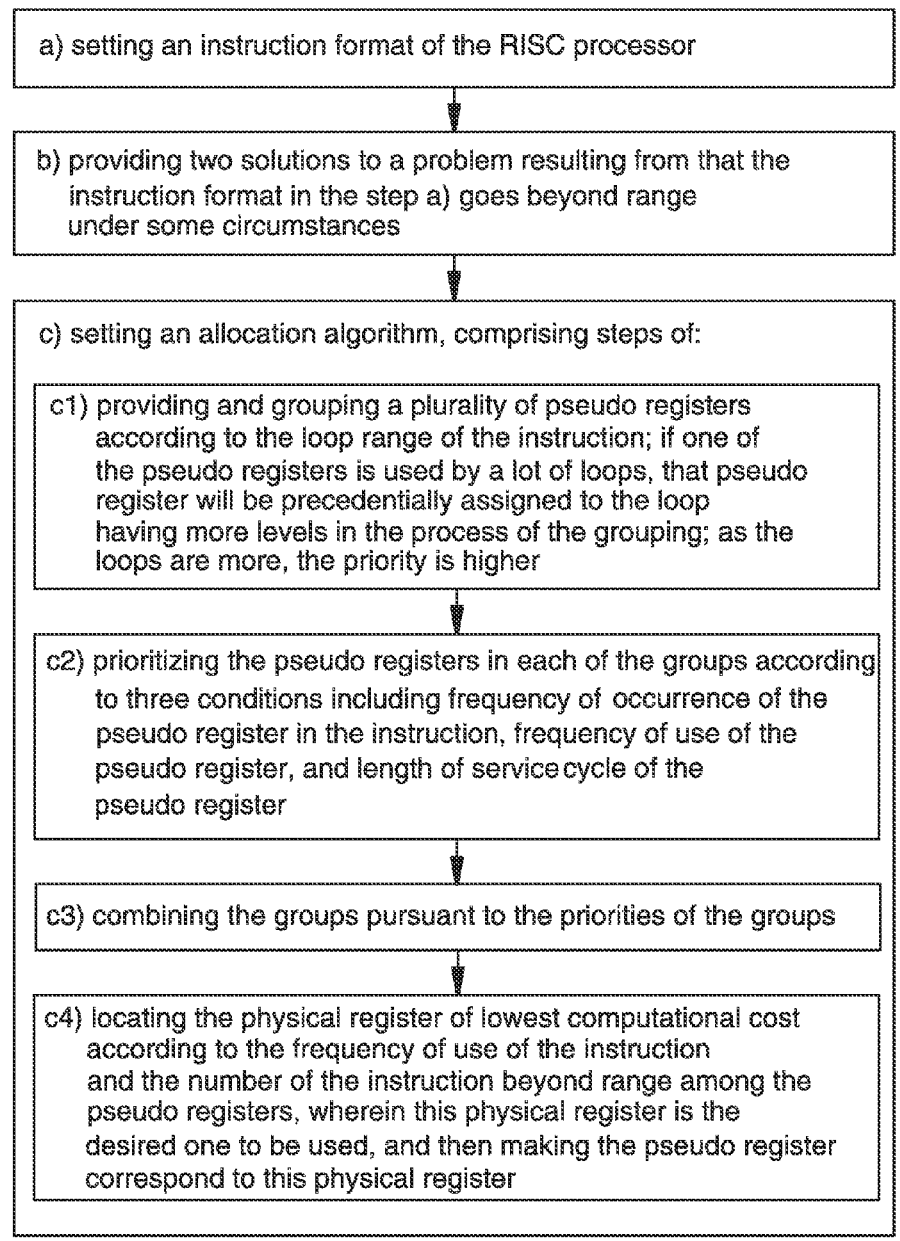
FIG. 5 is a flow diagram illustrating steps for a segment allocation method of expanding an RISC processor register according to a preferred embodiment.

Referring to FIGS. 1-2 and 5, a segment allocation method of expanding an RISC processor register in accordance with a first preferred embodiment of the present invention includes the following steps.

a) Set the instruction format of the RISC processor. The instruction format is composed of at least two register fields corresponding to a plurality of registers. One of the at least two register fields is a destination register field 21 and at least one source register field 31 separately. Set the destination register field 21 having 6 bits for saving a destination-register code (not shown) corresponding to the 64 registers. The destination register field 31 includes at least 4 bits for saving a difference between a code of a register saved by the destination register field 21 and a code of a register corresponding to the source register field 31. In light of the difference, the source register field 31 can correspond to at least 16 registers and define two of the registers corresponding to the source register field 31 as a stack pointer register and a zero register separately. The capacity that the source register field 31 can save the difference is subject to the size of the source register field 31 plus what it takes for defining the aforesaid two registers. In this embodiment, a Rs register field is 4-bit, so a register corresponding to −8 can be reserved for the stack pointer register and a register corresponding to −7 can be reserved for the zero register, as shown below in Table 1.

TABLE 1

| | | |
|---|---|---|
| $sp (Stack Pointer Register) | Rs (4-bit) −8 | Rt (5-bit) −16 |
| $zero (Zero Register) | Rs (4-bit) −7 | Rt (5-bit) −15 |

In addition, in this embodiment, the instruction format is R-type as an example, corresponding to Rs, Rt, and Rd register fields to have 15 bits. The Rd register field is the destination register field 21 and has 6 bits. Each of the Rs and Rd register fields is the source register field 31, the Rs register field having 4 bits, the Rt register field having 5 bits, the two source register fields 31 totally having 9 bits. A special movement instruction can be used for regarding the Rs and Rt register fields as a united 9-bit register field for computation, as shown below in Table 2.

TABLE 2

| | | |
|---|---|---|
| R-type Instruction Format | Rd | 6 bits corresponding to 64 registers as the destination register field |
| | Rd | 4 bits (−6-+7) as the source register field |
| | Rt | 5 bits (−14-+15) as the source register field |
| I-type Instruction Format | Rt | 6 bits corresponding to 64 register as the destination register field |
| | Rs | 4 bits (−6-+7) as the source register field | b) Provide two solutions to the problem that the instruction format in the step a) goes beyond range under some circumstances. Taking the following instruction as an

| | | | | |
|---|---|---|---|---|
| example | ADD | R1 | R62 | R10 |
| Code | | 1 | 61 | 9 |

In the above instruction, the distance between R1 and R62 is 61 to go beyond range.

Figure 3:
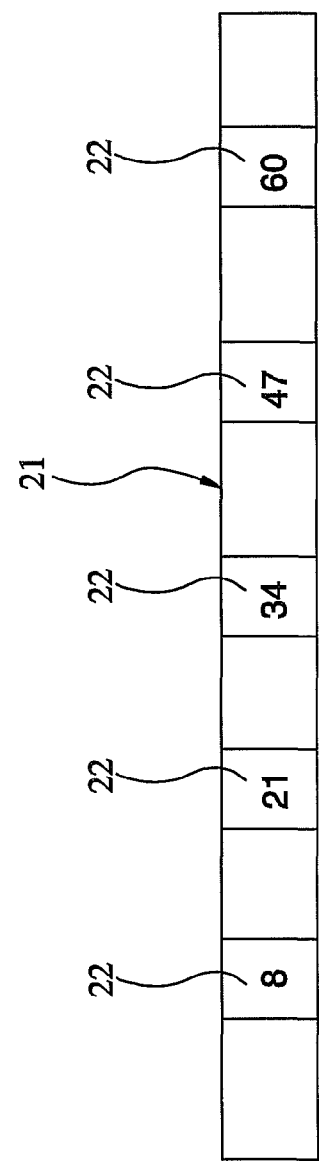
FIG. 3 is another schematic view of the first preferred embodiment of the present invention, showing that the reserved registers are located in the destination register.

The two solutions are: (i) regarding the 64 (0-63) registers as an endless circle; namely, the 64$^{th}$ register and the 0 register are deemed adjacent to and connected with each other, as shown in FIG. 2; and (ii) reserving a plurality of the registers among the 64 registers corresponding to the destination register field 21 and defining them as plural reserved registers 22, the plural reserved registers 22 being spaced from one another for a predetermined number of registers, as shown in FIG. 3. In this embodiment, the predetermined number of the registers is 12 not over 16 to which 4 bits correspond. The plural reserved registers 22 can be conveniently inserted by the special movement instruction (e.g. ADD_special Rd, Rs, Rt), which can allow data movement among the registers of less than 9 bits (i.e. no more than 128 registers). In this embodiment, there can be a third solution: (iii) when a computational instruction is provided with exchangeability and a priority number corresponding to one register fails to be encoded in the Rs register field but can be encoded in the Rt register field, exchange the priorities of the Rs register field and the Rt register field relative to the computational instruction for encoding. The third solution is simpler than the other two, takes less computational resource, and very applicable to where the operators are exchangeable. Besides, the computational instructions whose operators are exchangeable can be ADD, MUL, AND or OR.

c) Set a register allocation algorithm for finding a desired physical register among physical registers for the registers required by one instruction. The algorithm includes the following steps.

c1) Provide and group a plurality of pseudo registers according to the loop range of the instruction. If one of the pseudo registers is used by a lot of loops, the pseudo register will be precedentially assigned to the loop having more levels in the process of the grouping. As the loops are more, the priority is higher.

The term "pseudo register" is an imaginary register of a common complier for facilitating the internal operations inside the complier that is the known manner in the art. The number of the pseudo register can be infinite, but before the assembly language is generated, the pseudo register will correspond to the unemployed physical registers or the time being. In the common complier, variants of programs can be converted into the pseudo registers during the middle process. The term "loop range of instruction" means that while a variant is used in a loop, the variant exist within the range of this loop. As for the term "used by a lot of loops", a variant may be used by a lot of loops, so it happens "used by a lot of loops". The phrase "precedentially assigned to the loop having more levels in the process of grouping" indicates that if some pseudo register is used by a lot of loops, i.e. "used by a lot of loops" as mentioned above, this pseudo register will be precedentially assigned to the loop having more levels in the process of the grouping. This loop having more levels indicates the loop having more sub-loops. The phrase "loops are more" implies that the "number" of the loops is larger and namely, the "level" of the loops are more.

c2) Prioritize the pseudo registers in each of the groups according to three conditions including frequency (Nrefs) of occurrence of the pseudo register in the instructions, frequency (Freq) of use of the pseudo register, and length (Live_Length) of service cycle of the pseudo register, constituting a formula (1) shown below:

$$\frac{Nrefs \cdot Freq}{Live\_Length} \quad (1)$$

where the pseudo registers are prioritized as per the aforesaid formula (1).

c3) Combine the groups in turn pursuant to the priorities of the groups.

c4) Locate lowest computational consumption according to the frequency of use of the instruction and the number of the instruction beyond range among the pseudo registers, wherein this physical register corresponding to the lowest computational consumption is the desired one to be used, and then make the pseudo register correspond to this physical register. The lowest computational consumption is located by the following formula (2):

$$\sum_{i=0}^{n} Out\_of\_range\_Ins(i) \cdot Freq\_I \quad (2)$$

where Freq_I indicates the frequency of use of the instruction corresponding to the pseudo register and Out_of_range_Ins(i) indicates the i-th instruction going beyond range; the total sum comes up with the relationship between the number of instruction beyond range and the frequency of use of instruction corresponding to the pseudo register.

As for term "lowest computational cost", the complier, as such, includes a predetermined physical register corresponding to every pseudo register in design mechanism, so after the computational cost is calculated, the physical register of the lowest computational cost can be located and set to this column and then the complier will process it. For example, if the predetermined physical register of the pseudo register is the element 20, all of the instructions using the pseudo register 100 in the program generated finally will use the physical register 20. Regarding the term "frequency of use of the instruction", the computational cost is calculated according to whether every instruction uses the register. If the instruction uses the pseudo register, the cost will be updated, so the frequency of use of the instruction for the register can be understood. The phrase "the number of instruction beyond range among the pseudo registers" indicates that in the above-discussed step b), it can happen under some circumstances, namely, the number of the instruction beyond range among the pseudo registers. As for the phrase "making the pseudo register correspond to this physical register", from the list of currently available physical pseudo registers, the potential costs incurred while these physical pseudo registers are used will be calculated and then the physical pseudo register of the lowest cost will be selected and set to be the predetermined physical register.

Only one new instruction—special movement instruction—is added in the aforesaid step and the special movement instruction is available only when the instruction goes beyond range, such that the availability of the special movement instruction is not much and the special movement instruction in the process of encoding does not take much space to bring forth little effect on the whole code size.

In light of the above, without prolonging the register field of the existing instruction in the first embodiment, the number of the register can be expanded to 64 and all of the registers can be efficiently utilized, bringing forth little effect on the code size.

Referring to FIG. 1 again, a segment allocation method of expanding an RISC processor register in accordance with a first preferred embodiment of the present invention is similar to that of the first embodiment, having the following difference recited below.

In the step a), the instruction format is I-type and corresponds to Rs and Rt register fields to have 10 bits; the Rt register field is the destination register field 21 having 6 bits, and the Rs register field is the source register field 31 having 4 bits, as shown in Table 2.

The second embodiment also likely has the problem of going beyond range, so the aforesaid three solutions (i)-(iii) indicated in the first embodiment can also be adopted to improve the problem. The other steps of the second embodiment and the effects attained thereby are identical to those of the first embodiment, so more recitation is skipped.

Although the present invention has been described with respect to specific preferred embodiments thereof, it is in no way limited to the specifics of the illustrated structures but changes and modifications may be made within the scope of the appended claims.

What is claimed is:

1. A segment allocation method of expanding an RISC processor register, comprising steps:
    a) setting an instruction format of the RISC processor, the instruction format having at least two register fields, whose number corresponds to that of the registers and which are a destination register field and at least one source register respectively, setting that the destination register field has 6 bits for saving a destination register code corresponding to 64 registers and the source register field has 4 bits for saving a difference that is defined between a code of a register of the destination register field and that of the source register field, the difference corresponding to at least 16 registers, the registers corresponding to the at least one source register field and being defined as a stack pointer register and a zero register respectively, the capacity of the source register field being capable of saving the difference depending on its size minus what it takes for defining the two registers;
    b) providing two solutions to a problem resulting from that the instruction format in the step a) goes beyond range under some circumstances: (i) regarding the 64 (0-63) registers corresponding to the destination register field as an endless circle, namely deeming the 63rd and 0 register adjacent and connected with each other; (ii) reserving a plurality of the registers among the 64 registers and defining them as plural reserved registers, the plural reserved registers being spaced from one another for a predetermined number of the registers, the plural reserved registers being adapted for convenient insertion of a special movement instruction that can enable data movement among the registers of less than 9 bits (i.e. no more than 128 registers); and
    c) setting an allocation algorithm for finding a desired physical register among physical registers for the registers required by one instruction, the register allocation algorithm comprising steps of:
        c1) providing and grouping a plurality of pseudo registers according to the loop range of the instruction; if one of the pseudo registers is used by a lot of loops, that pseudo register will be precedentially assigned to the loop having more levels in the process of the grouping; as the loops are more, the priority is higher;

c2) prioritizing the pseudo registers in each of the groups according to three conditions including frequency of occurrence of the pseudo register in the instruction, frequency of use of the pseudo register, and length of service cycle of the pseudo register;

c3) combining the groups pursuant to the priorities of the groups; and c4) locating the physical register of lowest computational cost according to the frequency of use of the instruction and the number of the instruction beyond range among the pseudo registers, wherein this physical register is the desired one to be used, and then making the pseudo register correspond to this physical register.

2. The method as defined in claim 1, wherein the instruction in the step a) is R-type and corresponds to Rs, Rt, and Rd register fields to have 15 bits, the Rd register field being the destination register field and having 6 bits, each of the Rs and Rt register fields being the source register field, the Rs register field having 4 bits, the Rt register field having 5 bits, the two source register fields totally having 9 bits; the special movement instruction regards the Rs and Rt register fields as a united 9-bit register field for computation.

3. The method as defined in claim 2, wherein the step b) further comprises a third solution to the problem indicated in the step a), the third solution being of: (iii) exchanging the priorities of the Rs register field and the Rt register field relative to a computational instruction having exchangeability while a priority number corresponding to one register fails to be encoded in the Rs register field but can be encoded in the Rt register field.

4. The method as defined in claim 3, wherein the computational instruction whose operator is exchangeable can be ADD, MUL, AND or OR.

5. The method as defined in claim 1, wherein the instruction format is I-type and corresponds to Rs and Rt register fields to have 10 bits, the Rt register field being the destination register field having 6 bits, the Rs register field being the source register field having 4 bits.

6. The method as defined in claim 1, wherein the plural reserved registers are spaced from one another for 12 registers.

7. The method as defined in claim 1, wherein the three conditions in the step c2) are defined as Nrefs for the frequency of occurrence of the pseudo register in the instructions, Freq for the frequency of use of the pseudo register, and Live_Length for the length of service cycle of the pseudo register, whereby a formula is constituted as follows:

$$\frac{Nrefs \cdot Freq}{Live\_Length}$$

where the pseudo registers are prioritized as per the aforesaid formula.

8. The method as defined in claim 1, wherein the lowest computational consumption is calculated by the following formula:

$$\sum_{i=0}^{n} Out\_of\_range\_Ins(i) \cdot Freq\_I$$

where Freq_I indicates the frequency of use of the instruction corresponding to the pseudo register and Out_of_range_Ins(i) indicates the i-th instruction going beyond range; the total sum comes up with the relationship between the number of instruction beyond range and the frequency of use of instruction corresponding to the pseudo register.

* * * * *